March 23, 1954  A. LIGUORI  2,673,331
LINEAR PERIOD PULSE MODULATOR
Filed Sept. 27, 1951
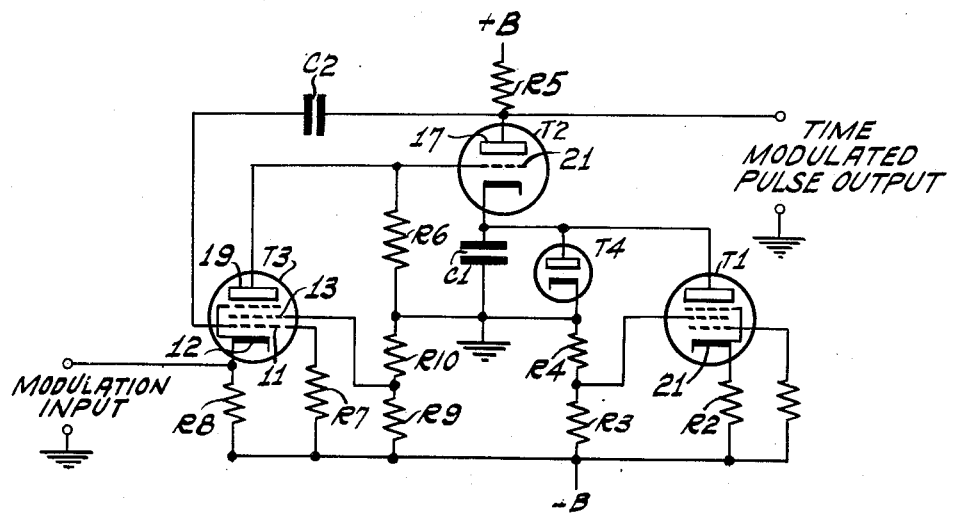
*Fig_1*
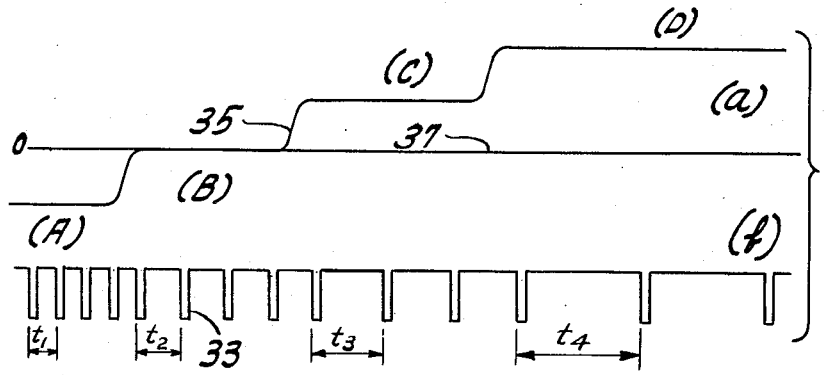
*Fig_2*
INVENTOR
*Anthony Liguori*
BY
*Charles H. Brown*
ATTORNEY Patented Mar. 23, 1954

2,673,331

UNITED STATES PATENT OFFICE 2,673,331

LINEAR PERIOD PULSE MODULATOR

Anthony Liguori, New York, N. Y., assignor to Radio Corporation of America, a corporation of Delaware Application September 27, 1951, Serial No. 248,493

4 Claims. (Cl. 332—14)

The invention is directed to pulse modulation systems. It particularly pertains to a circuit arrangement for producing a train of pulses having a time spacing directly proportional to the amplitude of a desired modulating signal.

A considerable number of pulse modulation schemes are known to the art. For example, a train of constant amplitude, constant width and constant repetition rate pulses may be modulated by a desired signal to vary the amplitude, or to vary the width, or to vary the repetition rate of the pulses in proportion to a characteristic of the signal, such as the amplitude or the frequency thereof. U. S. Patent 2,456,089, for example, issued December 14, 1948, to E. R. Shenk and A. Liguori, describes a wide-band frequency modulator for producing a train of pulses of repetition frequency directly proportional to the amplitude of the applied modulating wave.

There are applications, however, where it is desired to produce a train of pulses spaced apart in time proportional to the amplitude of the modulating wave. One such application is found in a proposed facsimile transmitting system wherein the repetition rate of pulses conveying the intelligence is preferably logarithmically proportional to the amplitude of the intelligence signal wave. Another, and perhaps more important, application is suggested for a telemetering system where it would be desirable to transmit pulses spaced apart in time proportional to the instantaneous value about a given reference value of the data to be transmitted.

It is an object of the invention to provide a novel circuit arrangement for producing a train of pulses spaced apart in time directly proportional to the instantaneous amplitude of a signal wave conveying intelligence which is desired to be transmitted.

Conversely, it is an object of the invention to provide a novel circuit arrangement for producing a train of pulses of repetition frequency logarithmically proportional to the instantaneous amplitude of the signal wave.

It is another object of the invention to provide an improved and simplified circuit arrangement for producing a train of pulses spaced apart by time periods proportional to the amplitude of a given signal wave.

These and other objects of the invention which will appear as the specification progresses are attained in accordance with the invention by integrating a current obtained from a suitable constant current source in a capacitor connected in a monostable multivibrator or trigger circuit having one condition of stability to which it tends to return. The arrangement is such that when the potential developed across the capacitor reaches a critical magnitude the multivibrator is tripped to the unstable condition and the capacitor is discharged in a very short time. Then the multivibrator is restored to the stable condition and the capacitor is recharged. In this manner a train of pulses of given repetition rate is developed. Modulating current or voltage is applied to the multivibrator to control the critical magnitude of the charge across the capacitor at the time of discharge and thereby produce time modulation of the pulse train by controlling the value to which the capacitor is charged and as a consequence vary the repetition rate at which the multivibrator is triggered to discharge and recharge the capacitor.

A specific embodiment of the invention, given by way of example only, will be described with reference to the accompanying drawing, forming a part of the specification, and in which:

Fig. 1 is a schematic diagram of a circuit arrangement according to the invention; and Fig. 2 is a graphical repetition of an output wave developed by the circuit arrangement shown in Fig. 1 in response to a given modulating wave.

Referring to Fig. 1, a triode vacuum tube T2 and a pentode vacuum tube T3 constitute a monostable multivibrator wherein the pentode tube T3 is normally conducting and the triode tube T2 is normally blocked. The triode tube T2 is biased beyond cutoff by the IR drop existing across a resistor R6 in the grid circuit. Constant current obtained from a constant current device including another pentode tube T1 is applied to a storage capacitor C1 which performs an integrating function. The cathode of tube T2 is driven negative with respect to ground as the charge across the storage capacitor C1 increases. When the charge on the capacitor C1 reaches a predetermined value, the multivibrator is triggered thereby to the unstable condition wherein the triode T2 is conducting. When the triode T2 is conducting, a negative pulse is applied by way of a coupling capacitor C2 to the control grid 11 of the pentode T3 to block the latter. The length of time during which the triode T2 is conducting and the pentode T3 is blocked is determined primarily by the time constants of the circuit comprising the coupling capacitor C2 and the resistors R5 and R7 in the anode circuit of triode T2 and the grid circuit of the pentode T3. When the triode T2 conducts, it draws off all the electrons from the storage capacitor C1. A diode T4 is provided to supply electrons to maintain conduction of the triode T2 after the storage capacitor C1 is completely discharged. In the embodiment shown in Fig. 1, the grid 11 is connected to the negative terminal —B of a direct potential source by the grid resistor R7. The cathode 12 is also connected to this source by a fixed resistor R8. The screen grid 13 is connected to a point between a pair of resistors R9 and R10 of a potential divider circuit one end of which is grounded as is the positive terminal of the above mentioned direct potential source.

The anode 17 of tube T2 is connected to the positive terminal +B of another direct current source by the anode resistor R5 and to the control grid of the pentode tube T3 by the coupling capacitor C2. The negative terminal of the other direct current source is connected to ground. It should be obvious, however, that the means to supply operating potentials may be in the form of a single power supply having a potential totaling the +B-to-ground and ground-to-—B values and a bleeder circuit, connected to ground at the proper potential level, arranged to provide the proper current values. The anode 19 of the pentode tube T3 is connected to the grid of tube T2 and to ground by way of resistor R6 so that the anode 19 is supplied with a direct current potential which is positive relative to that on the cathode 12 because the cathode is connected to the negative terminal of the first mentioned direct potential source.

The storage capacitor C1 is charged by a pentode tube T1 connected in a known constant current device circuit. Resistors R2, R3 and R4 of the constant current device circuit are all fixed value resistors, so that the current flow through the pentode T1 to the storage capacitor C1 is of constant magnitude. The voltage across the capacitor C1 is, therefore, proportional to time.

With a given potential existing across the cathode resistor R8 of tube T3 a train of output pulses uniformly spaced in time will be available at the anode 17 of tube T2. The spacing will depend on the time required for charging the storage capacitor C1 to a value overcoming the bias existing on the control grid 21 of tube T2.

The modulating signal is applied between the cathode 12 of the multivibrator pentode T3 and ground to cause the current flow through that tube and through the resistor R6 to vary. The IR drop across the resistor R6 and the bias on the triode T2 will vary accordingly and thus change the time required for the storage capacitor C1 to charge to the critical voltage. The critical voltage Ec is equal to the algebraic sum of the voltage Ecc developed across the grid resistor R6 of the triode T2 and the cutoff voltage of the triode Eco. The cutoff voltage Eco is constant for a given value of anode supply voltage for a given type of tube. A negative signal applied to the cathode of the pentode T3 will increase the current flow through the tube T3 and through the grid resistor R6. This will increase the bias on the triode T2; that is, the grid of the triode T2 will become more negative. A linear increase in the bias on the triode T2 will result in an increase in the time required for the storage capacitor C1 to charge to the critical voltage. Due to the arrangement of the pentode T3 in a constant current circuit similar to that of the pentode T1 the period of time between actuations of the multivibrator circuit will increase linearly with a signal that is linearly increasing in the negative direction.

Referring to Fig. 2 there is shown a pair of curves representing an output voltage wave 33 obtained from an applied modulating voltage wave 35 of varying amplitude of a type which may be encountered in facsimile or telemetering applications. With no signal applied to the cathode 12 of the pentode T3 as represented in the second portion B of Fig. 2(a) by coincidence of curve 35 with the zero modulation level line 37, an output pulse train of pulses spaced apart by a time period $t2$ as represented by line 33 of Fig. 2(b) will be obtained. With a negative voltage input to the pentode T3 as shown in the left-most portion A of Fig. 2(a), a train of pulses spaced at intervals of $t1$ as shown in Fig. 2(b) will result. Similarly input levels as shown in the remaining portions C and D of Fig. 2(a) will determine the spacing between pulses of $t3$ and $t4$ as shown in the corresponding portions of curve 33. While relatively constant levels of modulating signal have been shown for convenience in explaining the operation of the circuit arrangement according to the invention, it should be obvious that a sine wave potential could be applied to the input circuit of the pentode T3 to produce a time modulate output pulse train changing the period $t$ between pulses directly proportional in an algebraic sense to the amplitude of the modulating wave if desired. It is essential, of course, that the frequency of the modulating signal be not greater than one-half of the lowest frequency of the multivibrator circuit in order that faithful reproduction of the modulation will not be prevented.

Where a pulse type output is useful the embodiment as shown in Fig. 1 is used. Where square or sine wave output operation is required an adaptation of the circuit shown in Fig. 2 of U. S. Patent 2,456,089 issued December 14, 1948, to E. R. Shenk and A. Liguori may be employed. The pulses are used to trigger a bistable multivibrator from one stable state to the other on every pulse obtained from the anode of the triode T2 to produce a square wave of half the frequency or repetition rate of the pulse train. A low pass filter which passes the fundamental frequency plus the modulation side bands may be coupled to the output of the bistable multivibrator to convert the square wave output to an output sinusoidal in form if the latter is desired.

A circuit arrangement suitable for demodulating a pulse train or a sinusoidal signal derived in circuit arrangements according to the invention will be readily suggested to those skilled in the art after reference to the description of the demodulator circuit of Fig. 4 of U. S. Patent 2,456,026, issued December 14, 1948, to E. R. Shenk and A. Liguori.

The invention claimed is:

1. A pulse modulation circuit arrangement including an electron discharge device having at least a cathode, a grid and an anode, an electron discharge structure having at least cathode, grid and anode electrodes, a series circuit comprising an output load impedor having a terminal connected to said anode, a storage capacitor having one electrode connected to said cathode, and a resistance element having one terminal connected to the other electrode of said capacitor and the other terminal connected to the anode electrode of said electron discharge structure, a connection between the anode of said structure and the grid of said device, a capacitive coupling element connected between a grid electrode of said structure and the anode of said device, an input load impedor having one terminal connected to the cathode electrode of said electron discharge structure, means to apply operating potential to said series circuit, a resistance element connected between the grid and cathode electrodes of said electron discharge structure, and a constant current device connected across said storage capacitor to charge the same, thereby to produce a train of pulses at said output load impedor spaced apart by time periods proportional to modulating potential applied to said input load impedor.

2. A pulse modulator circuit arrangement including an electron discharge system having a cathode, a control grid, and an anode, an output load resistor connected between said anode and a point of positive potential, an electron discharge structure having cathode, control grid and screen grid electrodes and an anode electrode connected to said control grid, a coupling capacitor interconnecting said grid electrode and said anode of said electron discharge system, a cathode resistor connected between said cathode electrode and a point of negative potential, a storage capacitor connected between said cathode and a point of potential intermediate said negative and positive points of potential, a grid resistor coupled between said grid electrode and said point of negative potential, a resistor network coupling said screen grid electrode between said points of negative and intermediate potential to provide constant current output from said electron discharge structure, a bias resistor connected between said control grid and said point of intermediate potential, a constant current device connected across said storage capacitor and means to apply modulating potentials to said cathode electrode thereby to produce pulses across said output load resistor spaced apart by time periods linearly proportional to the instantaneous amplitude of said modulating potentials.

3. A pulse modulation circuit arrangement including an electron discharge device having a cathode, a grid and an anode, an electron discharge structure having cathode, control grid, screen grid and anode electrodes, a series circuit comprising an output load impedor having a terminal connected to said anode, a storage capacitor having one electrode connected to said cathode, and a resistance element having one terminal connected to the other electrode of said capacitor and the other terminal connected to the anode electrode of said electron discharge structure, a connection between the anode of said structure and the grid of said device, a capacitive coupling element connected between the control grid electrode of said structure and the anode of said device, a resistor connected between said other electrode of said storage capacitor and said screen grid electrode, a further resistor connected between said screen grid and cathode electrode, an input load impedor having one terminal connected to the cathode electrode of said electron discharge structure, means to apply operating potential to said series circuit, a resistance element connected between the control grid and cathode electrodes of said electron discharge structure, and a constant current device connected across said storage capacitor to charge the same, thereby to produce a train of pulses at said output load impedor spaced apart by time periods proportional to modulating potential applied to said input load impedor.

4. A pulse modulation circuit arrangement including an electron discharge device having at least a cathode, a grid and an anode, an electron discharge structure having at least cathode, grid and anode electrodes, a series circuit comprising an output load impedor having a terminal connected to said anode, a storage capacitor having one electrode connected to said cathode, and a resistance element having one terminal connected to the other electrode of said capacitor and the other terminal connected to the anode electrode of said electron discharge structure, a connection between the anode of said structure and the grid of said device, a capacitive coupling element connected between the grid electrode of said structure and the anode of said device, an input load impedor having one terminal connected to the cathode electrode of said electron discharge structure, a resistance element connected between the grid and cathode electrodes of said electron discharge structure, a constant current device connected across said storage capacitor to charge the same, having a cathode and an anode respectively connected to said one and said other electrodes of said storage capacitor, and means to apply operating potential across said input load impedor, thereby to produce a train of pulses at said output load impedor spaced apart by time periods proportional to modulating potential applied to said input load impedor.

ANTHONY LIGUORI.

References Cited in the file of this patent
UNITED STATES PATENTS

| Number | Name | Date |
|---|---|---|
| 2,410,920 | Atwood | Nov. 12, 1946 |
| 2,456,089 | Shenk et al. | Dec. 14, 1948 |